United States Patent [19]

Gerich

[11] Patent Number: 4,549,676

[45] Date of Patent: Oct. 29, 1985

[54] LIQUID MIXING AND PURGING APPARATUS

[76] Inventor: Horst Gerich, 24034 Welby Way, Canoga Park, Calif. 91307

[21] Appl. No.: 532,590

[22] Filed: Sep. 16, 1983

[51] Int. Cl.$^4$ .............................................. B67D 5/60
[52] U.S. Cl. ................................... 222/145; 222/148; 239/112
[58] Field of Search ............... 222/148, 145, 129, 160, 222/167, 168, 144, 180, 394; 239/112, 414, 113, 104, 407

[56] References Cited

U.S. PATENT DOCUMENTS

| | | | |
|---|---|---|---|
| 3,572,366 | 3/1971 | Wiggins | 239/112 |
| 3,672,570 | 6/1972 | Scarbrough et al. | 239/112 |
| 3,674,205 | 7/1972 | Kock | 239/112 |
| 4,073,664 | 2/1978 | Zwirlein | 239/112 |
| 4,117,551 | 9/1978 | Brooks et al. | 222/148 |
| 4,407,431 | 10/1983 | Hutter, III | 222/148 |

Primary Examiner—Joseph J. Rolla
Assistant Examiner—Kenneth Noland

[57] ABSTRACT

An apparatus for mixing, dispensing and purging therefrom liquid compositions comprising two or more liquid components. Independent pressurized sources of the component liquids are coupled to a manifold assembly through appropriate check valves, the output of the manifold assembly being coupled to a serial assembly of mixing chambers and a flow gun. The check valves used to inhibit the flow of the component liquids each comprise a cylindrical member having a resiliently urged mating valve which halts the flow of the respective liquid upon a reduction in liquid pressure. A pressure relief valve is disposed intermediate the source of a catalyst component and the respective check valves to substantially reduce the pressure of the catalyst at the check valve so that the amount of base liquid required to purge the apparatus of the curing composition is substantially reduced.

10 Claims, 6 Drawing Figures

U.S. Patent Oct. 29, 1985 Sheet 1 of 2 4,549,676
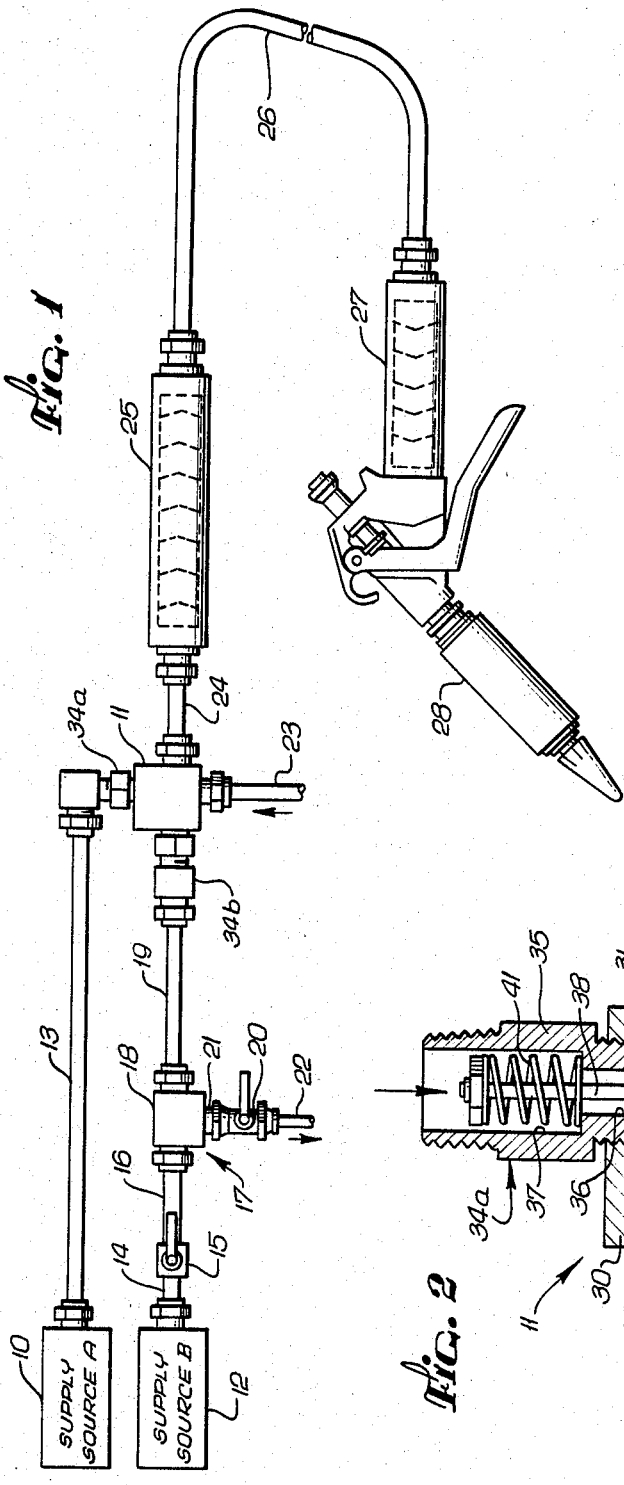
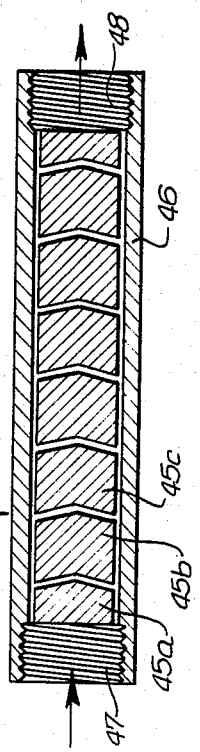
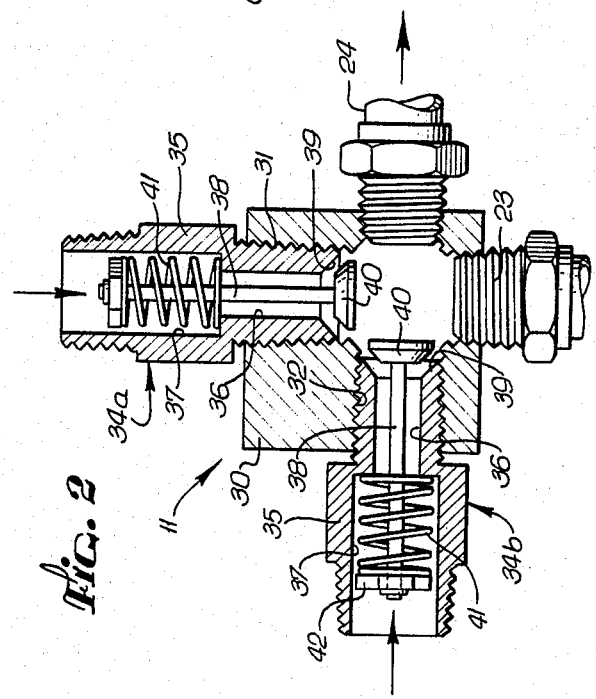

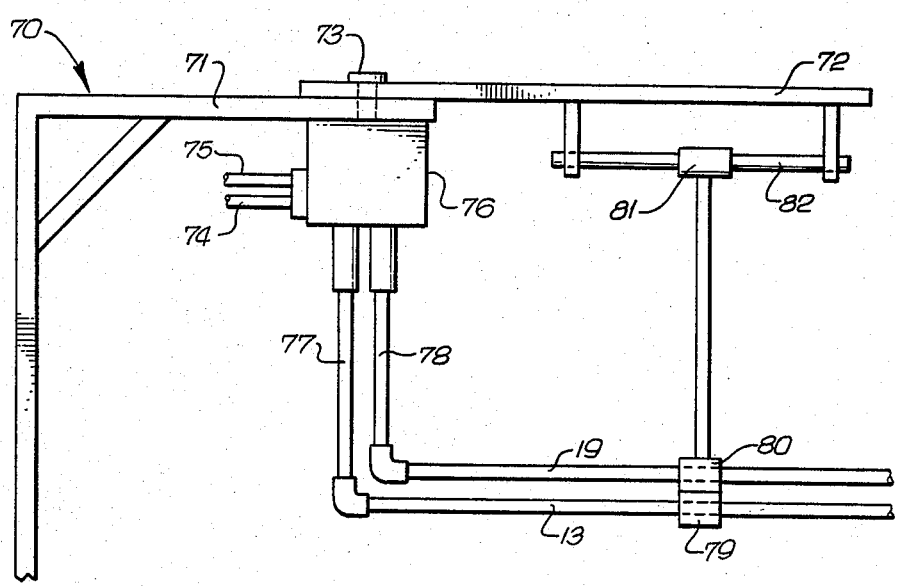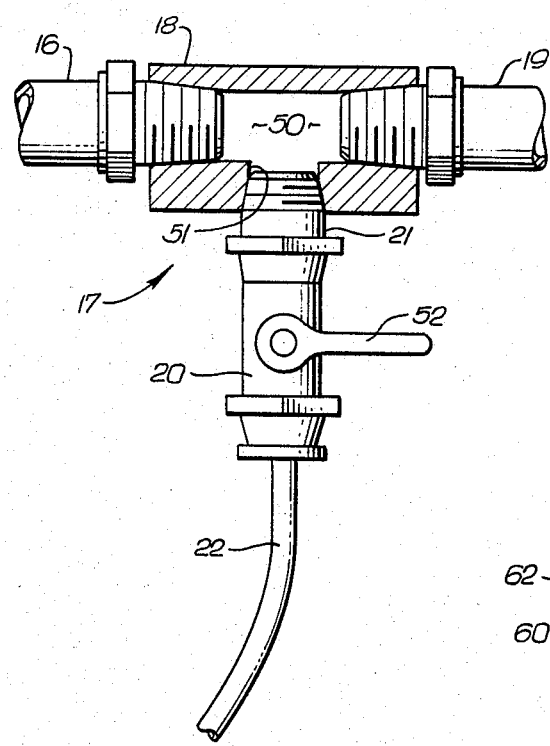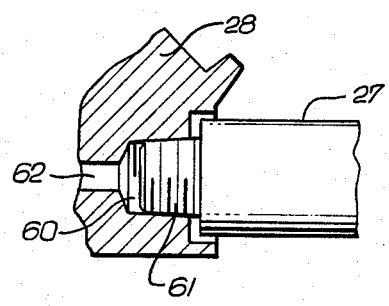

LIQUID MIXING AND PURGING APPARATUS

BACKGROUND OF THE INVENTION

1. Field of the Invention

The present invention generally relates to liquid mixing and dispensing systems and, more particularly, to those mixing and dispensing systems used for compositions having rapid curing times.

2. Prior Art

The prior art discloses a number of systems which are used to mix compositions comprising two or more liquid components such as a base liquid and a catalyst. A typical device employs a two-chamber dispenser for mixing liquids together. Another example consists of pumping the material through mechanical mixing devices placed just before the point of application. These devices have generally been too awkward and heavy because the driving mechanism and power source must be supplied to the mixing head. In addition, when the size of the device has been reduced to enhance mobility, the mixing device has to operate at higher speeds to provide effective mixing action. The use of higher speed can produce overheating and the inherent unwanted curing of the materials. A primary disadvantage of these devices is that cleaning is extremely difficult since a composition which includes a catalyst may cure inside of the mechanism which has no appropriate means for purging the composition.

Static mixing devices have been employed to overcome the disadvantages of mechanical means. In these devices, it is common to mount the static mixer near the source of supply and then extend tubing from the mixer to a dispenser. In these types of devices, a long and bulky static mixing chamber is needed to affect proper mixing. The chamber is mounted on a permanent support and the material flowed through a flexible hose to a hand held dispenser. Because the chamber and the flexible hose leading from the chamber is filled with the mixed material, the materials would have to be removed from the respective elements in order that they not cure within the chamber and hose. In order to purge the material from the interior of the system, a substantial amount of base material or solvent is required since the catalyst will still be present in sufficient amounts to require the wasting of base material or the auxiliary solvent.

Another problem which is inherent in the devices disclosed by the prior art is that they fail to provide sufficient means to purge the system if the material being mixed and dispensed has a rapid curing time. As the curing time decreases, it is possible that the material will not flow through the hose and dispenser prior to curing. This can result either in internal curing which can result in damage to or loss of the equipment or will limit the length of the hose leading from the mixing chamber. The present invention substantially resolves the problems which are inherent in the devices taught by the prior art. The present invention employs independent sources of the component liquids. A catalyst is forced through a pressure relief valve to a manifold assembly. The base liquid is coupled directly to the manifold assembly. Both the catalyst and base liquids are under high pressure to provide the force necessary for the mixing and dispensing operations. The coupling of the catalyst to the manifold assembly is through a check valve which will shut off the flow of the liquid when the pressure in the input line is reduced below a specified level. Since a system can be purged by merely running base liquid through the entire system, the operation of the pressure relief valve in the catalyst input line will substantially halt the flow of catalyst through the manifold assembly permitting the mixing chambers, hose and flow gun to be purged of the curing composition in a more efficient, economical and expeditious manner.

SUMMARY OF THE INVENTION

The present invention essentially comprises a system for mixing, dispensing and purging therefrom liquid components typically consisting of base and catalyst materials. A source of base liquid is coupled to a manifold assembly through a resiliently opposing check valve which will allow the liquid to flow into the manifold only when the liquid pressure exceeds a predetermined amount. A source of liquid catalyst is coupled to the manifold assembly through a resiliently opposing check valve. Intermediate the source of catalyst and the catalyst check valve is disposed a pressure relief valve which is employed during the purging operation. The catalyst material is delivered to the catalyst check valve under high pressure. When the liquid composition is to be purged from the manifold assembly and the mixing tubes and flow gun, the purging can be accomplished through the use of the base material itself or solvent which can be supplied through an auxiliary inlet to the manifold assembly.

Whether purging is to be accomplished through the use of the base material alone or through the use of a solvent, the liquid pressure of the catalyst at the catalyst check valve must be lowered to reduce the amount of base or solvent required to purge the system. The pressure relief valve inserted between the source of catalyst material and the catalyst check valve lowers the pressure of the catalyst below that required to open the catalyst check valve. By substantially eliminating the flow of catalyst during the purging operation, the manifold assembly and the connected equipment can be cleaned of the curing composition with the use of substantially reduced amounts of base or solvent.

In order to enhance the use of the present invention apparatus, the output of the manifold assembly is through a series of cylindrical mixing chambers, connecting hose, and terminating in the flow gun. Mixing of the liquid input at the manifold assembly occurs substantially in the mixing tubes and coupled hose. It is therefore necessary that the mixing chambers have predetermined lengths to insure that the liquids will be fully mixed by the time they are dispensed at the flow gun. In addition, in order to overcome the physical mass of the system during operation, a supporting assembly supports the coupling between the source of component liquids and manifold assembly in a manner which will permit the pressurized couplings to be swiveled in an arc of 180°.

It is therefore an object of the present invention to provide an improved liquid mixing, dispensing and purging apparatus.

It is another object of the present invention to provide a liquid mixing, dispensing and purging apparatus which reduces the amount of base liquid or solvent necessary to purge the system.

It is still another object of the present invention to provide a liquid mixing, dispensing and purging apparatus which has increased mobility in the area of use.

It is still yet another object of the present invention to provide an improved liquid, mixing, dispensing and purging apparatus which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

FIG. 1 is a schematic view of the present invention illustrating the input of the base and catalyst liquids through the respective pressure relief valve, manifold assembly and mixing chambers.

FIG. 2 is an enlarged, cross-sectional view of the manifold assembly and internal check valves shown in FIG. 1.

FIG. 3 is a cross-sectional view of the mixing chamber shown in FIG. 1.

FIG. 4 is an enlarged, cross-sectional view of the catalyst pressure relief valve shown in FIG. 1.

FIG. 5 is a schematic view of the overhead supporting system for use with the present invention shown in FIG. 1.

FIG. 6 is an enlarged, cross-sectional view of the flow gun and attached mixing chamber shown in FIG. 1.

DESCRIPTION OF THE PRESENTLY PREFERRED EMBODIMENT

An understanding of the present invention can be best gained by reference to FIG. 1 wherein a schematic view of the liquid mixing, dispensing and purging system can be best seen. As stated, a primary object of the present invention is to provide an apparatus which will mix, dispense and provide means for purging a liquid composition typically comprised of two component liquids which can be categorized as a base and a catalyst. Referring now to FIG. 1, a schematic diagram of the present invention system is shown. Supply source A is generally designated by the reference numeral 10 and is a source of supply as a base liquid. Supply source A 10 is pressurized by conventional means in order to provide the force necessary to transport the base liquid to manifold assembly 11. Supply source B is generally designated by the reference numeral 12 and comprises a pressurized source of the catalyst. The pressurized base liquid is transported from supply source A 10 to manifold assembly 11 by way of a line or hose 13.

The pressurized catalyst is transported from supply source B 12 through line or hose 14 to valve 15 which controls the mixing/purging modes of operation of the present invention system. When the pressurized catalyst is being mixed with the base liquid, valve 15 will be opened permitting the catalyst to pass through line or hose 16 to the pressure relief valve assembly 17. Pressure relief valve assembly 17 comprises a T coupling. The input of T coupling 18 is secured to line 16, the output of coupling 18 being secured to line 19. As stated, when in the purge mode, relief valve 20 will be opened to a reduced pressure environment thereby permitting an alternate path for the catalyst liquid via lines 21 and 22.

When in the mixing mode, pressurized base and catalyst liquids will enter manifold assembly 11 through check valves which will be described in detail hereinbelow. As stated, when the base and catalyst liquids being mixed have a long curing time, the system can be purged of the curing material through the use of the base liquid alone. On the other hand, if liquids having fast curing times are being mixed, solvent input 23 to manifold assembly 11 can be employed for a source of liquid solvent which will then be used to clean all materials from the manifold assembly and the dispensing portion of the system which will be described in detail. In the mixing mode, the liquids being combined are output from manifold assembly 11 via line 24. Line 24 connected to a static mixing chamber 25 which is in turn connected to dispensing line 26. Dispensing line 26 is connected to a second static mixing chamber 27 which is in turn coupled to flow gun 28 from which the totally mixed composition is dispensed.

Referring now to FIG. 2, the manifold assembly 11 is shown in greater detail. Manifold assembly 11 comprises supporting block 30 having intersecting screw-threaded channels 31 and 32. When the composition being mixed has a high curing time, i.e., 1-3 hours, the system can be purged by the use of the base material itself which will therefore not require any auxiliary solvent. On the other hand, where fast curing times are encountered for such materials as urethane, a third input channel 23 is required through which solvents can be pumped.

The check valves which are used for the base, catalyst and, if needed, the solvent, are identical and are generally designated by the reference numerals 34a, 34b, etc. Check valves 34a, 34b, etc. comprise an outer cylindrical casing 35, the forward end thereof being threaded for engagement with screw-threaded channels 31 and 32. The preferred embodiment of the present invention employs check valves 34a and 34b, each of which include a first interior bore 36 which is in juxta-position to the inner-section of channels 31 and 32. A second cylindrical bore 37 is in axial alignment with the first bore 36 and is in communication therewith. Check valves 34 are intended to stop the flow of the respective liquid when the magnitude of pressurization falls below a predetermined level. To accomplish this, valve stem 38 is disposed within the first and second bores 36 and 37 along the axis thereof. The output terminus 39 of casing 35 is beveled to receive valve 40. As will be discussed hereinbelow, the seating interface between beveled surface 39 and valve 40 will effectively cut off the flow of liquid when the respective supply source is being pumped at a reduced pressure. Valve 40 is connected to valve stem 38 and is thereby controlled by the movement of valve stem 38. Helical valve spring 41 is disposed about valve stem 38, one end of valve spring 41 being adjacent the interface between first and second bores 36 and 37, the other end thereof being adjacent spring retainer 42. Spring retainer 42 is geometrically shaped to permit the respective liquid to flow through the check valves 34a and 34b, e.g., "X" or stop configuration.

In operation, when the liquid in lines 13 or 19 are sufficiently pressurized to force valve 40 away from beveled surface 39, valve spring 41 will be compressed between spring retainer 42 and the interface between bores 36 and 37. As stated, since spring retainer 42 is secured to valve stem 38, valve 40 will be urged away from beveled surface 39 to permit the flow of liquid. When the pressure at which the liquid is being pumped is reduced below that necessary to compress valve spring 41, valve spring 41 will expand thereby engaging valve 40 against beveled surface 39 and halting the flow of liquid. In the mixing mode, the base and catalyst liquids are pressurized to 1,500 psi. Preferably, when the pressure is reduced to 500 psi, valve 40 will be seated at surface 39 inhibiting liquid flow.

Static mixing chambers 25 and 27 are shown in detail in FIG. 3. With the exception of length, the static mixing chambers 25 and 27 are substantially identical and are conventional items which are well known in the art. Typically, a plurality of mixing segments 45a, 45b, 45c, etc., are axially aligned in outer shell 46. Material is input at inlet 47 and throughly mixed in the volume between mixing segments 45a, 45b, 45c, etc. The mixed composition is output at terminus 48 where it engages the respective line 26 or flow gun 28. In order to insure that the composition is throughly mixed, static mixing chambers 25 and 27 must have sufficient length and internal mixing segments 45a, 45b, 45c, etc. As a result of this requirement, static mixing chamber 25 cannot be less than 10 inches in length and static mixing chamber 27 must be at least 6.25 inches in length.

The pressure relief valve assembly 17 shown in FIG. 1 can be best seen by reference to FIG. 4. T coupling 18 has a central axial bore 50 and a branch intersecting bore 51. The opposed ends of central bore 50 are coupled by appropriate fittings to lines 16 and 19. Branch intersecting bore 51 is connected to relief valve 20 through an appropriate fitting. Valve handle 52 is schematically depicted in a closed position thereby precluding the flow of catalyst through relief valve 20 to output line 22 and the atmosphere. In operation, the catalyst is pumped from supply source B 12 through T coupling 18 at a pressure which is typically 1,500 psi. Even after the pumping means used to pressurize the catalyst is turned off, the pressure in lines 14, 16 and 19 will still be high enough to cause the catalyst check valve 34b to permit catalyst to enter the intersecting channels 31 and 32 of manifold assembly 11. To reduce this pressure, relief valve 20 is opened to lower the pressure of the catalyst to atmospheric pressure thereby cutting off the flow of all catalyst into manifold assembly 11.

The interconnection between static mixing chamber 27 and flow gun 28 can be best seen by reference to FIG. 6 wherein a partial, sectional view of the flow gun coupling can be best seen. One of the objectives of the present invention is the mixing of highly viscous liquids. In order to provide the greater output capacity for the flow gun, the flow gun 28 is cast to provide direct coupling to the output fittings of static mixing chamber 27. As shown in FIG. 6, inlet port 60 of flow gun 28 has a screw-threaded inlet chamber adapted to engage mating screwthreads 61 of static mixing chamber 27. The contiguous bore 62 through which the mixed liquid passes can be made larger than conventional flow guns when a single casting structure is produced in the manner shown in FIG. 6.

In operation, supply source A 10 comprises a pressurized source of base liquid. Supply source B 12 constitutes a pressurized source of catalyst. As stated, the sources are pressurized by approximately 1,500 psi. In the mixing mode, valve 15 is opened and pressure relief valve 20 is closed. The pressurized base and catalyst will be forced through check valves 34a and 34b respectively. Mixing will commence in manifold assembly 11 and be accomplished in lines 24 and 26 as well as static mixing chambers 25 and 27. The mixed composition will be output through the operation of flow gun 28. A primary objective of the present invention is to prevent contamination of the manifold assembly, lines 24 and 26, static mixing chambers 25 and 27, and flow gun 28 as a result of cured material being lodged therein. The prime objective of the present invention is to permit the purging of the mixed composition while minimizing the use of the purging liquid whether it be base material itself or an auxiliary solvent. In the purging mode, valve 15 is closed cutting off any further supply of catalyst from supply source B 12. Since the remaining catalyst in lines 16 and 19 will still be pressurized at a level sufficient to open check valve 34b and thereby permit additional catalyst to enter manifold assembly 11, unless the pressure can be reduced, excessive amounts of purging liquid will be required since a portion thereof will start to cure in the presence of catalyst. To meet this prime objective, pressure relief valve 20 is opened to remove a sufficient amount of catalyst to lower the pressure in line 19 to a level which will permit valve spring 41 in check valve 34b to expand and thereby close valve 40. When check valve 34b is closed, no additional catalyst can enter manifold assembly 11. Once the source of catalyst is terminated, the system can be purged of the curing composition while minimizing the amount of base liquid or solvent which is used. It has been found that only a pint of base material is needed to purge curing material from the present invention system as opposed to substantially larger amounts required by systems disclosed in the prior art.

As stated, one of the inherent disadvantages of the systems taught by the prior art concerns the mobility of the system. In order to solve this problem, the present invention employs the supporting structure shown in FIG. 5 which is generally designated by the reference numeral 70. Support structure 70 employs a mounting frame 71 of sufficient height so that the operating end of the system can be suspended over the work area. Extension arm 72 extends from and is appropriately journeled about a shaft 73 which is secured to mounting frame 71. The supply to base and catalyst material are individually input at line 74 and 75 to boom manifold 76 which, like extension arm 72, pivots about shaft 73. The separate lines 77 and 78 are rigid conduits for the base and catalyst liquids. To provide the mobility required, extension member 72 is pivotable in a 180° arc about shaft 73. To support the weight of the inlet lines 13 and 19 (FIG. 1), supporting guides 79 and 80 are slidably disposed about the exerior surfaces. Guides 79 and 80 are suspended from a slidable guide 81 which moves along a horizontal track 82 which is in parallel spaced relation to extension arm 72. Use of the supporting apparatus shown in FIG. 5 substantially increases the mobility and ease of use of the system since the operator will have substantial access to the work area without having to support the weight of the system. It can therefore be seen that the present invention provides a substantial advantage over the systems disclosed in the prior art.

I claim:

1. An apparatus for the mixing, dispensing and purging of a composite liquid consisting of at least a base liquid and a catalyst liquid reactive with each other comprising:

(a) a first supply source of base liquid;
(b) a second supply source of catalyst liquid;

(c) power means to pressurize each of said supply sources;

(d) a manifold assembly comprising a liquid check means for inhibiting the flow of catalyst liquid therethrough; said liquid check means being movable to an open position upon a predetermined pressurization of the second supply source of the catalyst liquid, thereby permitting the catalyst liquid to flow from the second supply source into the manifold assembly; said liquid check means being movable to a closed position upon decrease of the pressurization of the catalyst liquid below said predetermined pressurization, thereby stopping the flow of catalyst liquid from the second supply source into the manifold assembly;

(e) first means for coupling said pressurized supply source of base liquid to said assembly;

(f) second means for coupling said pressurized source of catalyst liquid to said assembly;

(g) the base liquid and catalyst liquid intermixing in the manifold assembly when the liquid check means is in said open position;

(h) pressure relief means, disassociated from said power means, for lowering the pressurization of the catalyst liquid, said pressure relief means coupled intermediate said second pressurized supply source of catalyst liquid and said liquid check means and being operable to vent said second source to atmospheric pressure which is lower than the pressurization of the second source;

(i) means to activate said pressure relief means when the pressurization of the catalyst liquid is below said predetermined pressurization, thereby insuring that the liquid check means will remain in the closed position, while simultaneously continuing the pressurization of said base liquid such that it continues to flow into the manifold assembly;

(j) an exit means from the manifold assembly to permit the base liquid and catalyst liquid to flow out of the assembly;

(k) said first means and said liquid check means being so constructed and arranged relative to each other that when said liquid check means is in the closed position and the base liquid continues to flow into said assembly and out the exit means, the base liquid impinges on the liquid check means to insure that all catalyst liquid is removed from the assembly due to the base liquid flow; and, (l) mixing means to receive the flow from the assembly and further mix the base liquid and catalyst liquid, said mixing means being coupled to said manifold assembly.

2. An apparatus for the mixing, dispensing and purging of a composite liquid as defined in claim 1 wherein said liquid check means comprises a substantially cylindrical casing having input and output ends and first and second contiguous internal bores therethrough, said first and second internal bores being in axial alignment with each other and adjacent the input end and the output end of said casing respectively, said first internal bore having a larger diameter than said second internal bore, a valve adapted to engage the output end of said casing, and resilient means for seating said valve and the output end of said casing when the pressure of the liquid passing through the casing falls below a predetermined value, said resilient means being disposed within said first and second internal bores.

3. An apparatus for the mixing, dispensing and purging of a composite liquid as defined in claim 2 wherein said resilient means comprises:

(a) a valve stem secured to said valve in axial alignment with said first and second internal bores;

(b) a spring retainer disposed within said first internal bore and being securely mounted to said valve stem; and (c) a helical spring disposed about said valve stem intermediate said spring retainer and the portion of said casing at the end of said first internal bore which is adjacent the second internal bore.

4. An apparatus for the mixing, dispensing and purging of a composite liquid as defined in claim 1 wherein said mixing means comprises:

(a) a first static mixing chamber having first and second ends, said first end being coupled to said manifold assembly at the output end of said liquid check means;

(b) a second static mixing chamber having first and second ends, said first end being serially coupled to the second end of said first static mixing chamber; and (c) a flow gun having an inlet port, said inlet port being directly coupled to the second end of said second static mixing chamber.

5. An apparatus for the mixing, dispensing and purging of a composite liquid as defined in claim 4 wherein the length of said first static mixing chamber is not less than 10 inches and the length of said second static mixing chamber is not less than 6.25 inches.

6. An apparatus for the mixing, dispensing and purging of a composite liquid as defined in claim 1 wherein said pressure relief means comprises a conduit extending from the pressurized supply source of catalyst liquid to said liquid check means, and a valve disposed intermediate said conduit and the atmosphere whereby the pressure in said conduit can be equalized to atmospheric pressure.

7. An apparatus for the mixing, dispensing and purging of a composite liquid as defined in claim 1 further including a supporting apparatus comprising:

(a) a supporting frame including a vertical member and an integral horizontal member secured at the upper extent of said vertical member;

(b) an extension arm pivotally coupled to said horizontal member;

(c) manifold means for individually transporting said base liquid and catalyst and being pivotally coupled to said horizontal member and being adapted to concurrently pivot with said extension arm, said manifold member being coupled to said pressurized supply source of base liquid and said pressurized source of catalyst;

(d) first and second conduits coupled to said manifold means, each of said first and second conduits being connected to one of said pressurized sources of base liquid and catalyst respectively; and (e) supporting means for supporting said first and second conduits, said supporting means suspended from said extension arm.

8. An apparatus for the mixing, dispensing and purging of a composite liquid consisting of at least a mutually reactive base liquid and catalyst comprising:

(a) pressurized supply source of base liquid;

(b) a pressurized supply source of catalyst;

(c) first and second liquid check valves each comprising a substantially cylindrical casing having input and output ends and first and second contiguous internal bores therethrough, said first and second internal bores being in axial alignment with each other and adjacent the input end and the output end of said casing respectively, said first internal bore having a larger diameter than said second internal bore, and a valve adapted to engage the output end of said casing, and resilient means for seating said valve and the output end of said casing when the pressure of the liquid passing through the casing falls below a predetermined value, said resilient means being disposed within said first and second internal bores; said resilient means comprises: (i) a valve stem secured to said valve in axial alignment with said first and second internal bores; (ii) a spring retainer disposed within said first internal bore and being securely mounted to said valve stem; and (iii) a helical spring disposed about said valve stem intermediate said spring retainer and the portion of said casing at the end of said first internal bore which is adjacent the second internal bore;

(d) means for coupling said pressurized supply source of base liquid to said first liquid check valve;

(e) a pressure relief valve coupled intermediate said pressurized supply source of catalyst and said second liquid check valve, said pressure relief valve comprising a conduit extending from the pressurized supply source of catalyst to said second liquid check valve and including a valve disposed intermediate said conduit and the atmosphere whereby the pressure in said conduit can be equalized to atmospheric pressure; and (f) mixing means for mixing the base liquid and catalyst flowing through said first and second check valve, said mixing means being coupled to the output ends of the casings of said first and second check valves; and said mixing means comprises: (i) a first static mixing chamber having first and second ends, said first end being coupled to said manifold assembly at the output end of said liquid check means; (ii) a second static mixing chamber having first and second ends, said first end being serially coupled to the second end of said first static mixing chamber; and (iii) a flow gun having an inlet port, said inlet port being directly coupled to the second end of said second static mixing chamber.

9. An apparatus for the mixing, dispensing and purging of a composite liquid as defined in claim 8 wherein the length of said first static mixing chamber is not less than 10 inches and the length of said second static mixing chamber is not less than 6.25 inches.

10. An apparatus for the mixing, dispensing and purging of a composite liquid consisting of at least a mutually reactive base liquid and catalyst comprising:

(a) a pressurized supply source of base liquid;

(b) a pressurized supply source of catalyst;

(c) first and second liquid check valves each comprising a substantially cylindrical casing having input and output ends and first and second contiguous internal bores therethrough, said first and second internal bores being in axial alignment with each other and adjacent the input end and the output end of said casing respectively, said first internal bore having a larger diameter than said second internal bore, and a valve adapted to engage the output end of said casing, and resilient means for seating said valve and the output end of said casing when the pressure of the liquid passing through the casing falls below a predetermined value, said resilient means being disposed within said first and second internal bores;

(d) means for coupling said pressurized supply source of base liquid to said first liquid check valve;

(e) a pressure relief valve coupled intermediate said pressurized supply source of catalyst and said second liquid check valve, said pressure relief valve comprising a conduit extending from the pressurized supply source of catalyst to said second liquid check valve and including a valve disposed intermediate said conduit and the atmosphere whereby the pressure in said conduit can be equalized to atmospheric pressure;

(f) mixing means for mixing the base liquid and catalyst flowing through said first and second check valve, said mixing means being coupled to the output ends of the casings of said first and second check valves; and, (g) supporting apparatus comprising:

(i) a supporting frame including a vertical member and an integral horizontal member secured at the upper extent of said vertical member;

(ii) an extension arm pivotally coupled to said horizontal member;

(iii) manifold means for individually transporting said base liquid and catalyst and being pivotally coupled to said horizontal member and being adapted to concurrently pivot with said extension arm, said manifold member being coupled to said pressurized supply source of base liquid and said pressurized supply source of catalyst;

(iv) first and second conduits coupled to said manifold means, each of said first and second conduits being connected to one of said pressurized sources of base liquid and catalyst respectively; and (v) supporting means for supporting said first and second conduits, said supporting means being suspended from said extension arm.

* * * * *